(12) United States Patent
Underhill

(10) Patent No.: US 11,247,155 B2
(45) Date of Patent: Feb. 15, 2022

(54) REMOVABLE FLUID REMOVAL PUMP FILTER

(71) Applicant: Edward Underhill, Mission Viejo, CA (US)

(72) Inventor: Edward Underhill, Mission Viejo, CA (US)

( * ) Notice: Subject to any disclaimer, the term of this patent is extended or adjusted under 35 U.S.C. 154(b) by 458 days.

(21) Appl. No.: 15/700,559

(22) Filed: Sep. 11, 2017

(65) Prior Publication Data

US 2018/0071668 A1   Mar. 15, 2018

Related U.S. Application Data

(60) Provisional application No. 62/385,376, filed on Sep. 9, 2016.

(51) Int. Cl.
| | | |
|---|---|---|
| *B01D 35/02* | (2006.01) | |
| *B01D 35/30* | (2006.01) | |
| *F04B 53/20* | (2006.01) | |
| *B01D 29/33* | (2006.01) | |
| *F04B 53/16* | (2006.01) | |
| *F04B 53/22* | (2006.01) | |

(52) U.S. Cl.
CPC .......... *B01D 35/306* (2013.01); *B01D 29/33* (2013.01); *B01D 35/02* (2013.01); *F04B 53/16* (2013.01); *F04B 53/20* (2013.01); *F04B 53/22* (2013.01); *B01D 2201/301* (2013.01)

(58) Field of Classification Search
CPC ...... F04D 29/70; F04D 29/708; F04D 29/701; F04B 53/20; F04B 53/005; F04B 53/16; F04B 53/22; B01D 35/306; B01D 35/02; B01D 35/023; B01D 35/301; B01D 29/33; B01D 29/0013; B01D 29/0038; B01D 29/005; B01D 2201/301; B01D 35/0273; B01D 35/0276; B01D 35/04; B01D 35/046; B01D 2201/30; E21B 27/005; E21B 405/173; E21B 210/462; E03B 3/04; F16L 33/00; F16L 33/23; F16L 35/00

See application file for complete search history.

(56) References Cited

U.S. PATENT DOCUMENTS

| 1,967,785 A | * | 7/1934 | Schacht | ............... | E03C 1/086 |
| | | | | | 210/463 |
| 2,783,893 A | * | 3/1957 | Romanoff | ............. | A01K 63/04 |
| | | | | | 210/463 |

(Continued)

OTHER PUBLICATIONS

English language machine translation of JP2015-057288, 30 pages, No Date.*

(Continued)

*Primary Examiner* — Pranav N Patel
(74) *Attorney, Agent, or Firm* — Mitchell A. Rossman; Terra Nova Patent Law, PLLC

(57) ABSTRACT

The present invention provides a removable fluid removal pump filter for mounting on a fluid intake housing of a fluid removal pump having a fluid intake housing coupled to a pump shaft coupled to a head assembly having a pump handle and a discharge port. The removable fluid removal pump filter includes: a first member and a second member, wherein the second member is coupled to the first member and extends toward the proximal end of the first member. Methods of using the removable fluid removal pump filter are also disclosed.

15 Claims, 10 Drawing Sheets

(56) References Cited

U.S. PATENT DOCUMENTS

| | | | | |
|---|---|---|---|---|
| 3,613,894 | A * | 10/1971 | Clegg, Jr. | A62C 33/00 210/276 |
| 4,107,043 | A * | 8/1978 | McKinney | B01D 35/02 210/232 |
| 4,357,238 | A * | 11/1982 | Ziaylek, Jr. | A62C 33/00 210/232 |
| 5,922,197 | A * | 7/1999 | Sparks | E03F 7/00 210/232 |
| 6,949,198 | B2 * | 9/2005 | Reber | A62C 33/00 210/170.09 |
| 8,192,622 | B2 * | 6/2012 | Kozey | B01D 29/33 210/232 |

OTHER PUBLICATIONS

English language machine translation of JP2005-219028, 24 pages, No Date.*

* cited by examiner

REMOVABLE FLUID REMOVAL PUMP FILTER

RELATED APPLICATIONS

This application claims priority to U.S. Provisional Patent Application Ser. No. 62/385,376 filed Sep. 9, 2016, which is hereby incorporated by reference in its entirety for all purposes.

BACKGROUND OF THE INVENTION

There are many applications that require the use of a pump to remove fluid. For example, water can accumulate and need to be removed from lawn sprinklers, golf putting cups, irrigation valve boxes, fountains, boats, toilets, spas, pipes, drain traps, and the like. Typically, a portable hand pump can be used for these applications. However, debris in the water may accumulate in the hand pump and render it inoperable. In addition, if the pump rest against the ground while pumping, it may either loose it's suction and/or suck up large debris from ground.

What is needed is a removable filter for the intake housing of these pumps that minimizes debris from entering the pump and making the pump inoperable.

SUMMARY OF THE INVENTION

The present invention provides a removable fluid removal pump filter for mounting on a fluid intake housing of a fluid removal pump having an intake housing coupled to a pump shaft coupled to a head assembly having a pump handle and a discharge port. The removable fluid removal pump filter includes: a first member and a second member, wherein the second member is coupled to the first member and extends toward the proximal end of the first member. Methods of using the removable fluid removal pump filter are also disclosed.

The removable fluid removal pump filter is attached quickly and easily with hand pressure to the intake bottom of a fluid removal pump with a press fitting. The removable fluid removal pump filter has a series of apertures that filter out various debris in the fluid to prevent the fluid removal pump from being clogged. Further, the inlets of the removable filter are on the side which allows users to rest the pump on the ground to allowing for continued pumping without clogging or blocking the pump's suction.

Various debris may include, for example, sand, dirt, stones, leaves, grass clipping, and the like. During use, the removable fluid removal pump filter may become covered with debris, which is simply removed by hand or by back flushing the fluid removal pump. The fluid removal pump may be used to remove fluid from lawn sprinklers, golf putting cups, irrigation valve boxes, fountains, boats, toilets, spas, pipes, drain traps, and the like.

The present invention provides a removable fluid removal pump filter for mounting on a fluid intake housing of a fluid removal pump having an intake housing coupled to a pump shaft coupled to a head assembly having a pump handle and a discharge port. The removable fluid removal pump filter includes: a first member having a first surface, a second surface, a proximal end, and a distal end, wherein the first member includes an opening at the proximal end, wherein the second surface of the first member includes a first internal diameter at the proximal end, a second internal diameter adjacent to the first internal diameter, and a third internal diameter adjacent to the second internal diameter and at the distal end, wherein the first member includes one or more sets of apertures at the distal end; a second member having a first surface and a second surface, and wherein the first surface of the second member is coupled to the distal end of the first member and extends toward the proximal end of the first member.

In one embodiment, the first member is cylindrical. In one embodiment, the first internal diameter is greater than the second internal diameter, and wherein the second internal diameter is greater than the third internal diameter. In one embodiment, the one or more sets of apertures at the distal end include two sets of apertures spaced around the distal end of the first member.

In one embodiment, the one or more sets of apertures at the distal end include two sets of apertures oppositely spaced around the distal end of the first member.

In one embodiment, the first surface of the second member is coupled to the distal end of the first member to form a tray. In one embodiment, the tray is a rectangular-shaped tray. In one embodiment, the tray is a circular-shaped tray. In one embodiment, the tray is a polygonal-shaped tray. In one embodiment, the fluid is water.

The present invention provides a removable fluid removal pump filter for mounting on a fluid intake housing of a fluid removal pump having an intake housing coupled to a pump shaft coupled to a head assembly having a pump handle and a discharge port. The removable fluid removal pump filter includes: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the cylindrical first member includes one or more sets of apertures at the distal end; a second member having a first surface and a second surface, and wherein the first surface of the second member is coupled to the distal end of the cylindrical first member and extends toward the proximal end of the cylindrical first member.

In one embodiment, the first internal diameter is greater than the second internal diameter, and wherein the second internal diameter is greater than the third internal diameter. In one embodiment, the one or more sets of apertures at the distal end include two sets of apertures spaced around the distal end of the cylindrical first member. In one embodiment, the one or more sets of apertures at the distal end include two sets of apertures oppositely spaced around the distal end of the cylindrical first member.

In one embodiment, the first surface of the second member is coupled to the distal end of the cylindrical first member to form a tray. In one embodiment, the tray is a rectangular-shaped tray. In one embodiment, the fluid is water.

The present invention provides a removable fluid removal pump filter for mounting on a fluid intake housing of a fluid removal pump having an intake housing coupled to a pump shaft coupled to a head assembly having a pump handle and a discharge port. The removable fluid removal pump filter includes: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the first internal diameter is greater than the second internal diameter, wherein the second internal diameter is greater than the third internal diameter, wherein the cylindrical first member include two sets of apertures oppositely spaced around the distal end of the cylindrical first member; a second member having a first surface and a second surface, wherein the first surface of the second member is coupled to the distal end of the cylindrical first member and extends toward the proximal end of the cylindrical first member, and wherein the first surface of the second member is coupled to the distal end of the cylindrical first member to form a rectangular-shaped tray.

The present invention provides a removable water removal pump filter for mounting on a water intake housing of a water removal pump having an intake housing coupled to a pump shaft coupled to a head assembly having a pump handle and a discharge port. The removable water removal pump filter includes: a first member having a first surface, a second surface, a proximal end, and a distal end, wherein the first member includes an opening at the proximal end, wherein the second surface of the first member includes a first internal diameter at the proximal end, a second internal diameter adjacent to the first internal diameter, and a third internal diameter adjacent to the second internal diameter and at the distal end, wherein the first member includes one or more sets of apertures at the distal end; a second member having a first surface and a second surface, and wherein the first surface of the second member is coupled to the distal end of the first member and extends toward the proximal end of the first member.

In one embodiment, the first member is cylindrical. In one embodiment, the first internal diameter is greater than the second internal diameter, and wherein the second internal diameter is greater than the third internal diameter. In one embodiment, the one or more sets of apertures at the distal end include two sets of apertures spaced around the distal end of the first member. In one embodiment, the one or more sets of apertures at the distal end include two sets of apertures oppositely spaced around the distal end of the first member.

In one embodiment, the first surface of the second member is coupled to the distal end of the first member to form a tray. In one embodiment, the tray is a rectangular-shaped tray. In one embodiment, the tray is a circular-shaped tray. In one embodiment, the tray is a polygonal-shaped tray.

The present invention provides a removable water removal pump filter for mounting on a water intake housing of a water removal pump having an intake housing coupled to a pump shaft coupled to a head assembly having a pump handle and a discharge port. The removable water removal pump filter includes a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the cylindrical first member includes one or more sets of apertures at the distal end; a second member having a first surface and a second surface, and wherein the first surface of the second member is coupled to the distal end of the cylindrical first member and extends toward the proximal end of the cylindrical first member.

In one embodiment, the first internal diameter is greater than the second internal diameter, and wherein the second internal diameter is greater than the third internal diameter. In one embodiment, the one or more sets of apertures at the distal end include two sets of apertures spaced around the distal end of the cylindrical first member. In one embodiment, the one or more sets of apertures at the distal end include two sets of apertures oppositely spaced around the distal end of the cylindrical first member. In one embodiment, the first surface of the second member is coupled to the distal end of the cylindrical first member to form a tray. In one embodiment, the tray is a rectangular-shaped tray.

The present invention provides a removable water removal pump filter for mounting on a water intake housing of a water removal pump having an intake housing coupled to a pump shaft coupled to a head assembly having a pump handle and a discharge port. The removable water removal pump filter includes: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the first internal diameter is greater than the second internal diameter, wherein the second internal diameter is greater than the third internal diameter, wherein the cylindrical first member include two sets of apertures oppositely spaced around the distal end of the cylindrical first member; a second member having a first surface and a second surface, wherein the first surface of the second member is coupled to the distal end of the cylindrical first member and extends toward the proximal end of the cylindrical first member, and wherein the first surface of the second member is coupled to the distal end of the cylindrical first member to form a rectangular-shaped tray.

The present invention provides a fluid removal system. The fluid removal system includes: a fluid removal pump having a fluid intake housing coupled to a pump shaft coupled to a head assembly having a pump handle and a discharge port; a removable fluid removal pump filter including: a first member having a first surface, a second surface, a proximal end, and a distal end, wherein the first member includes an opening at the proximal end, wherein the second surface of the first member includes a first internal diameter at the proximal end, a second internal diameter adjacent to the first internal diameter, and a third internal diameter adjacent to the second internal diameter and at the distal end, wherein the first member includes one or more sets of apertures at the distal end; a second member having a first surface and a second surface, wherein the first surface of the second member is coupled to the distal end of the first member and extends toward the proximal end of the first member, and wherein the removable fluid removal pump filter is mounted on a fluid intake housing of the fluid removal pump.

In one embodiment, the fluid removal system is designed to remove fluid from lawn sprinklers. In one embodiment, the fluid removal system is designed to remove fluid from golf putting cups. In one embodiment, the fluid removal system is designed to remove fluid from sprinkler valve boxes. In one embodiment, the fluid removal system is designed to remove fluid from fountains. In one embodiment, the fluid removal system is designed to remove fluid from boats. In one embodiment, the fluid removal system is designed to remove fluid from toilets. In one embodiment, the fluid removal system is designed to remove fluid from spas. In one embodiment, the fluid removal system is designed to remove fluid from pipes. In one embodiment, the fluid removal system is designed to remove fluid from drain traps.

The present invention provides a fluid removal system. The fluid removal system includes: a fluid removal pump having a fluid intake housing coupled to a pump shaft coupled to a head assembly having a pump handle and a discharge port; a fluid removal pump filter including: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the cylindrical first member includes one or more sets of apertures at the distal end; a second member having a first surface and a second surface, wherein the first surface of the second member is coupled to the distal end of the cylindrical first member and extends toward the proximal end of the cylindrical first member, and wherein the removable fluid removal pump filter is mounted on a fluid intake housing of the fluid removal pump.

The present invention provides a fluid removal system. The fluid removal system includes: a fluid removal pump having a fluid intake housing coupled to a pump shaft coupled to a head assembly having a pump handle and a discharge port; a removable fluid removal pump filter including: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the first internal diameter is greater than the second internal diameter, wherein the second internal diameter is greater than the third internal diameter, wherein the cylindrical first member include two sets of apertures oppositely spaced around the distal end of the cylindrical first member; a second member having a first surface and a second surface, wherein the first surface of the second member is coupled to the distal end of the cylindrical first member and extends toward the proximal end of the cylindrical first member, wherein the first surface of the second member is coupled to the distal end of the cylindrical first member to form a rectangular-shaped tray, and wherein the removable fluid removal pump filter is mounted on a fluid intake housing of the fluid removal pump.

The present invention provides a water removal system. The water removal system includes: a water removal pump having a water intake housing coupled to a pump shaft coupled to a head assembly having a pump handle and a discharge port; a removable water removal pump filter including: a first member having a first surface, a second surface, a proximal end, and a distal end, wherein the first member includes an opening at the proximal end, wherein the second surface of the first member includes a first internal diameter at the proximal end, a second internal diameter adjacent to the first internal diameter, and a third internal diameter adjacent to the second internal diameter and at the distal end, wherein the first member includes one or more sets of apertures at the distal end; a second member having a first surface and a second surface, wherein the first surface of the second member is coupled to the distal end of the first member and extends toward the proximal end of the first member, and wherein the removable water removal pump filter is mounted on a water intake housing of the water removal pump.

In one embodiment, the water removal system is designed to remove water from lawn sprinklers. In one embodiment, the water removal system is designed to remove water from golf putting cups. In one embodiment, the water removal system is designed to remove water from sprinkler valve boxes. In one embodiment, the water removal system is designed to remove water from fountains. In one embodiment, the water removal system is designed to remove water from boats. In one embodiment, the water removal system is designed to remove water from toilets. In one embodiment, the water removal system is designed to remove water from spas. In one embodiment, the water removal system is designed to remove water from pipes. In one embodiment, the water removal system is designed to remove water from drain traps.

The present invention provides a water removal system. The water removal system includes: a water removal pump having a water intake housing coupled to a pump shaft coupled to a head assembly having a pump handle and a discharge port; a removable water removal pump filter including: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the cylindrical first member includes one or more sets of apertures at the distal end; a second member having a first surface and a second surface, wherein the first surface of the second member is coupled to the distal end of the cylindrical first member and extends toward the proximal end of the cylindrical first member, and wherein the removable water removal pump filter is mounted on a water intake housing of the water removal pump.

The present invention provides a water removal system. The water removal system includes: a water removal pump having a water intake housing coupled to a pump shaft coupled to a head assembly having a pump handle and a discharge port; a removable water removal pump filter including: a cylindrical first member having a first surface, a second surface, a proximal end, and a distal end, wherein the cylindrical first member includes an opening at the proximal end, wherein the second surface of the cylindrical first member includes a first internal diameter at the proximal end, a second internal diameter adjacent to the first internal diameter, and a third internal diameter adjacent to the second internal diameter and at the distal end, wherein the first internal diameter is greater than the second internal diameter, wherein the second internal diameter is greater than the third internal diameter, wherein the cylindrical first member include two sets of apertures oppositely spaced around the distal end of the cylindrical first member; a second member having a first surface and a second surface, wherein the first surface of the second member is coupled to the distal end of the cylindrical first member and extends toward the proximal end of the cylindrical first member, wherein the first surface of the second member is coupled to the distal end of the cylindrical first member to form a rectangular-shaped tray, and wherein the removable water removal pump filter is mounted on a water intake housing of the water removal pump.

The present invention also provides a method of using a removable fluid removal pump filter. The method includes; providing a fluid removal pump having an intake housing coupled to a pump shaft coupled to a head assembly having a pump handle and a discharge port; and inserting a removable fluid removal pump filter into the fluid intake of the fluid removal pump.

The present invention also provides a method of using a removable water removal pump filter. The method includes; providing a water removal pump having an intake housing coupled to a pump shaft coupled to a head assembly having a pump handle and a discharge port; and inserting a removable water removal pump filter into the water intake of the water removal pump.

BRIEF DESCRIPTION OF THE DRAWINGS

Embodiments of the invention may be best understood by referring to the following description and accompanying drawings, which illustrate such embodiments.

In the drawings.

Figure 1:
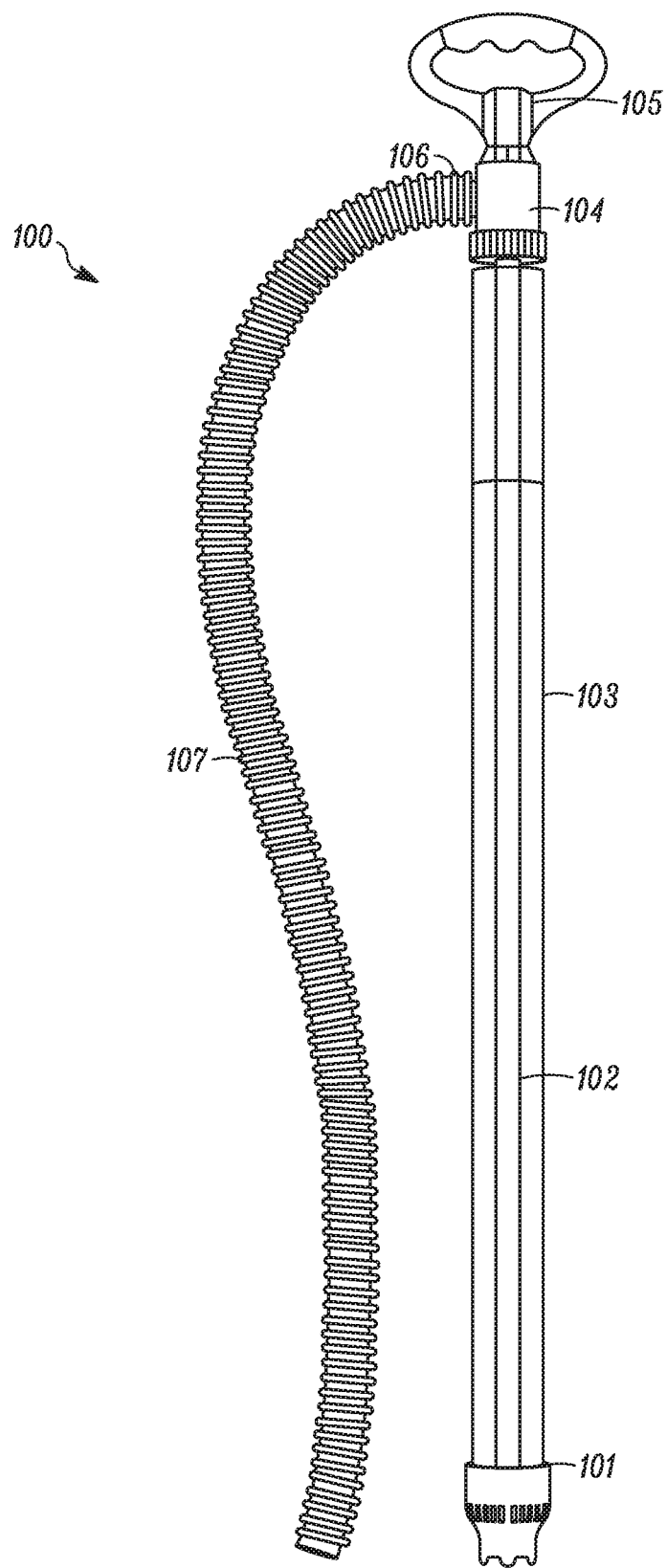
FIG. 1 is a side-view drawing illustrating an exemplary fluid removal pump.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a removable fluid removal pump filter for mounting on a fluid intake housing of a fluid removal pump. The removable fluid removal pump filter includes: a first member and a second member, wherein the second member is coupled to the first member and extends toward the proximal end of the first member. Methods of using the removable fluid removal pump filter are also disclosed.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, M A, 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "comprising" or "comprises" is intended to mean that the compositions and methods include the recited elements, but not excluding others.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "operatively coupled" refers to bringing two or more items together or into relationship with each other such that they may operate together or allow transfer of information between the two or more items.

As used herein, the terms "include," "for example," "such as," and the like are used illustratively and are not intended to limit the present invention.

As used herein, the temps "invention," "the invention," "this invention," "the present invention" and "disclosure" are intended to refer broadly to all of the subject matter of this patent and the patent claims below. Statements containing these terms should be understood not to limit the subject matter described herein or to limit the meaning or scope of the patent claims below. The subject matter should be understood by reference to appropriate portions of the entire specification of this patent, any or all drawings and each claim.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "proximal" refers to the closest end of an object. In contrast, the term "distal" refers to the farthest end of an object.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention illustratively disclosed herein suitably may be practiced in the absence of any element which is not specifically disclosed herein.

FIG. 1 is a side-view drawing illustrating an exemplary fluid removal pump 100, which can be used with the exemplary removable fluid removal pump filter 200. The fluid removal pump 100 includes a removable intake foot 101, a pump shaft 102, a clear cylinder body 103, a removable head assembly 104, a pump handle 105, a discharge hose connector 106, and a discharge hose 107. The fluid removal pump 100 may be used to remove fluid, for example, water, from lawn sprinklers, golf putting cups, irrigation valve boxes, fountains, boats, toilets, spas, pipes, drain traps, and the like.

Figure 2:
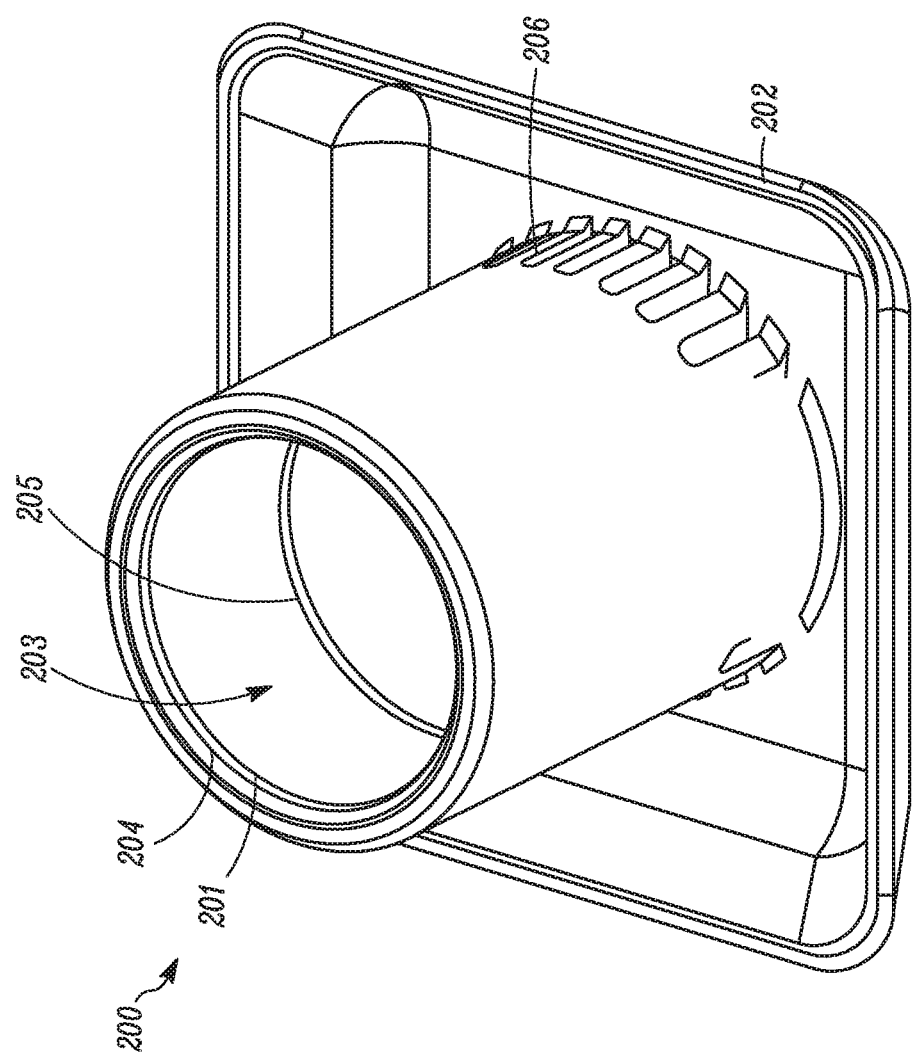
FIG. 2 is a perspective-view drawing illustrating an exemplary removable fluid removal pump filter.

FIG. 2 is a perspective-view drawing illustrating an exemplary removable fluid removal pump filter 200. The removable fluid removal pump filter 200 includes a first member 201 and a second member 202. The first member 201 has a first surface, a second surface, a proximal end, and a distal end. The first member 201 has an opening 203 at the proximal end. The first member 201 has a first internal diameter 204 at the proximal end, a second internal diameter 205 adjacent to the first internal diameter 204, and a third internal diameter (not shown) adjacent to the second internal diameter 205 and at the distal end. The first member 201 includes one or more sets of apertures 206 at the distal end. The second member 202 has a first surface and a second surface. The first surface of the second member 202 is coupled to the distal end of the first member 201 and extends toward the proximal end of the first member 201.

Figure 3:
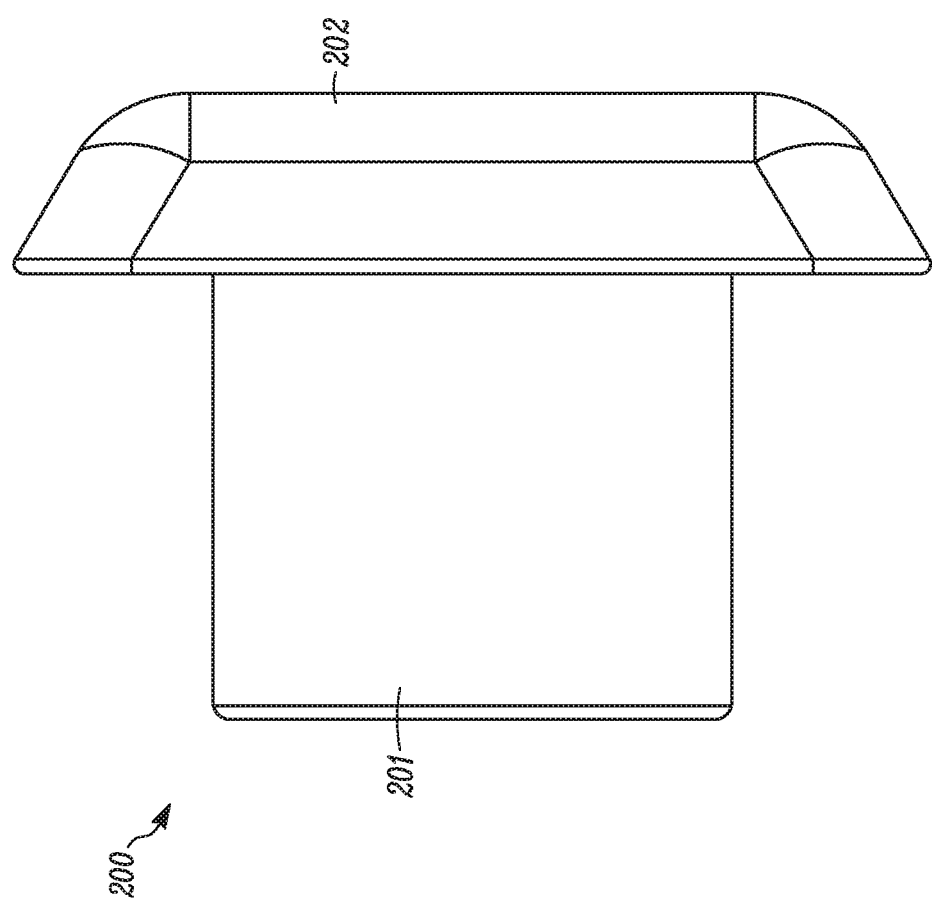
FIG. 3 is a side-view drawing illustrating an exemplary removable fluid removal pump filter.

FIG. 3 is a side-view drawing illustrating an exemplary removable fluid removal pump filter 200. The removable fluid removal pump filter 200 includes a first member 201 and a second member 202.

Figure 4:
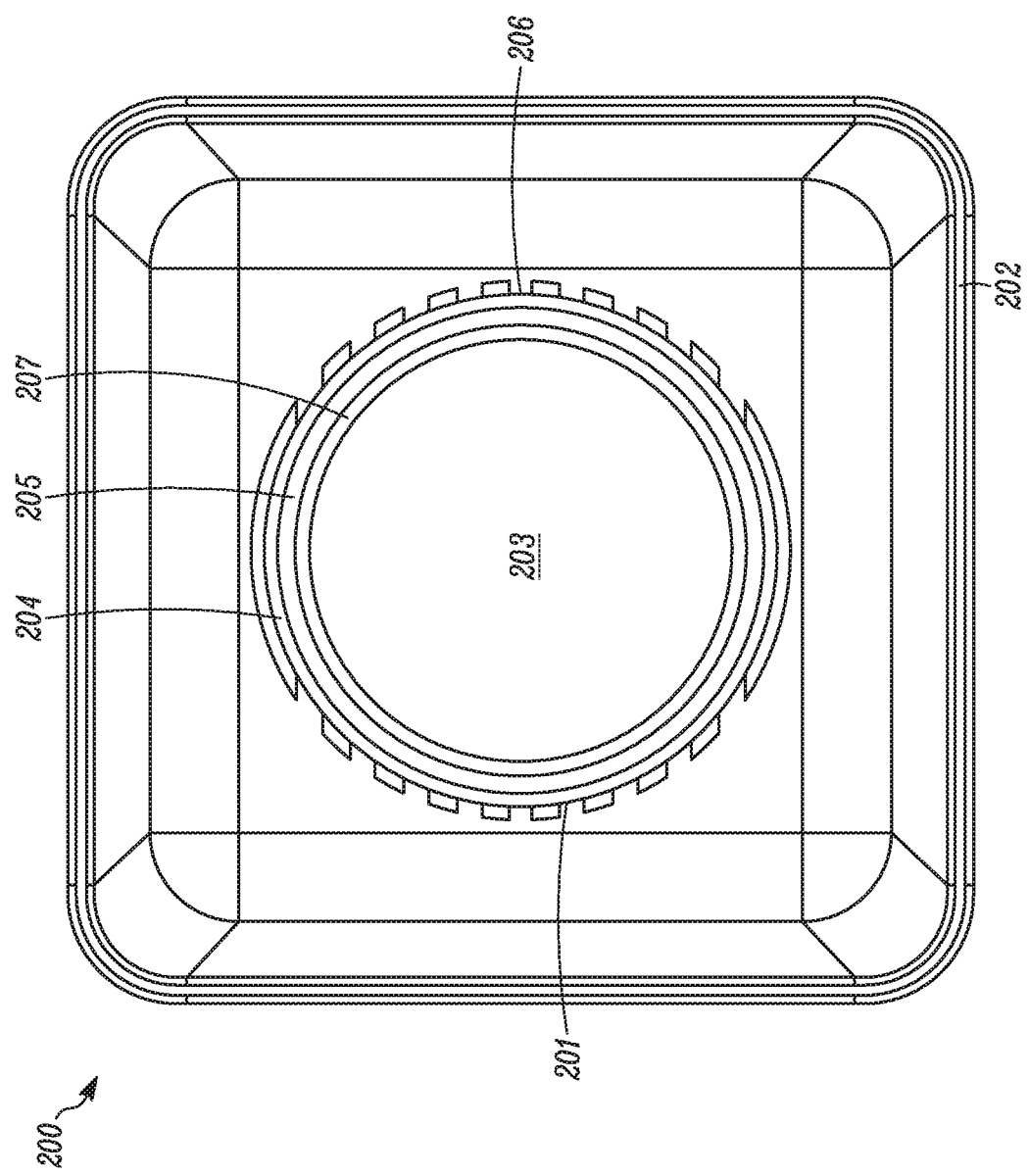
FIG. 4 is a top-view drawing illustrating an exemplary removable fluid removal pump filter.

FIG. 4 is a top-view drawing illustrating an exemplary removable fluid removal pump filter 200. The removable fluid removal pump filter 200 includes a first member 201 and a second member 202. The first member 201 has an opening 203 at the proximal end. The first member 201 has a first internal diameter 204 at the proximal end, a second internal diameter 205 adjacent to the first internal diameter 204, and a third internal diameter 207 adjacent to the second internal diameter 205 and at the distal end. The first member 201 includes one or more sets of apertures 206 at the distal end. The second member 202 has a first surface and a second surface. The first surface of the second member 202 is coupled to the distal end of the first member 201 and extends toward the proximal end of the first member 201.

Figure 5:
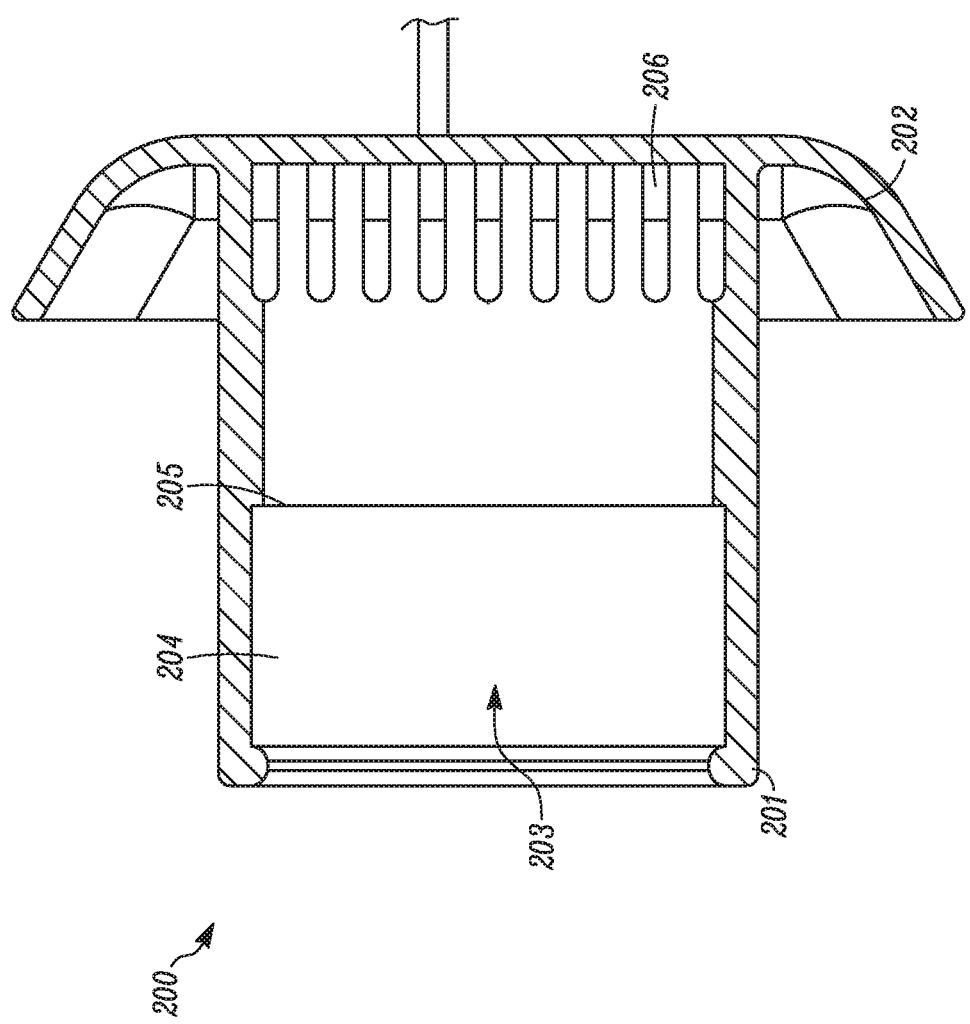
FIG. 5 is a cut away side-view drawing illustrating an exemplary removable fluid removal pump filter.

FIG. 5 is a cut away side-view drawing illustrating an exemplary removable fluid removal pump filter 200. The removable fluid removal pump filter 200 includes a first member 201 and a second member 202. The first member 201 has an opening 203 at the proximal end. The first member 201 has a first internal diameter 204 at the proximal end, a second internal diameter 205 adjacent to the first internal diameter 204, and a third internal diameter (not shown) adjacent to the second internal diameter 205 and at the distal end. The first member 201 includes one or more sets of apertures 206 at the distal end. The second member 202 has a first surface and a second surface. The first surface of the second member 202 is coupled to the distal end of the first member 201 and extends toward the proximal end of the first member 201.

Figure 6:
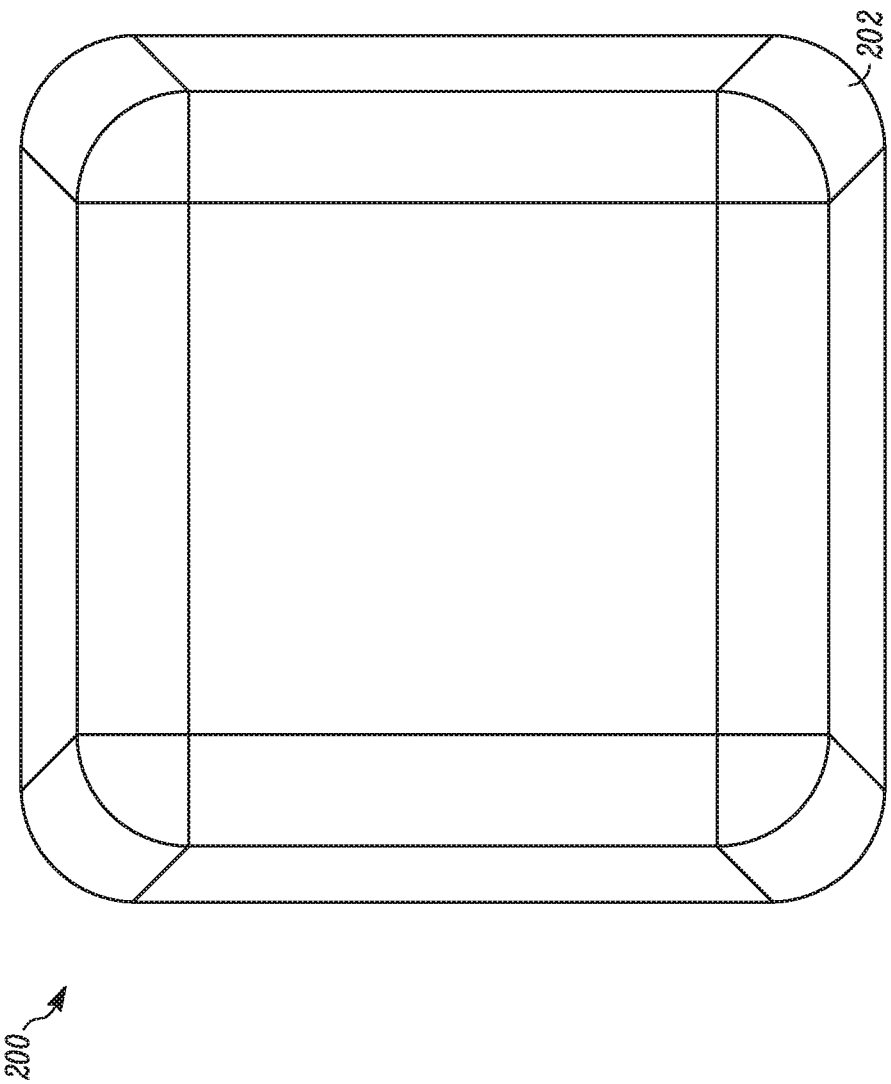
FIG. 6 is a bottom-view drawing illustrating an exemplary removable fluid removal pump filter.

FIG. 6 is a bottom-view drawing illustrating an exemplary removable fluid removal pump filter 200. The removable fluid removal pump filter 200 includes a first member (not shown) and a second member 202.

Figure 7:
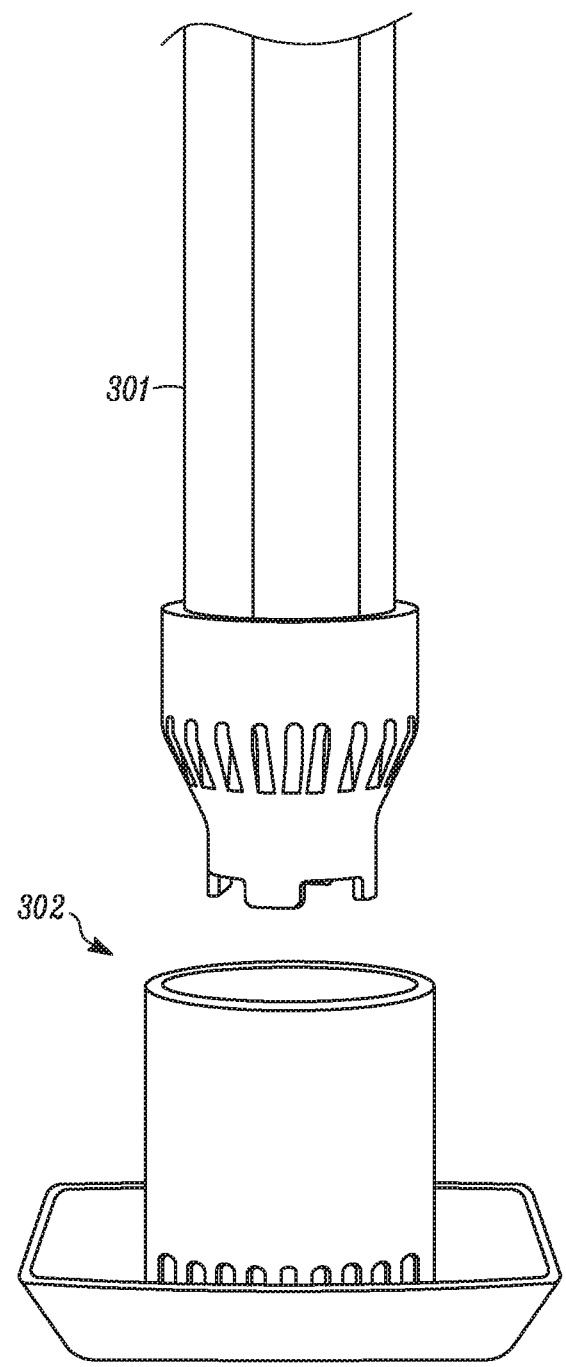
FIG. 7 is a side-view drawing illustrating an exemplary removable fluid removal pump being inserted into an exemplary removable fluid removal pump filter.

FIG. 7 is a side-view drawing illustrating an exemplary removable fluid removal pump 301 being inserted into an exemplary removable fluid removal pump filter 302.

Figure 8:
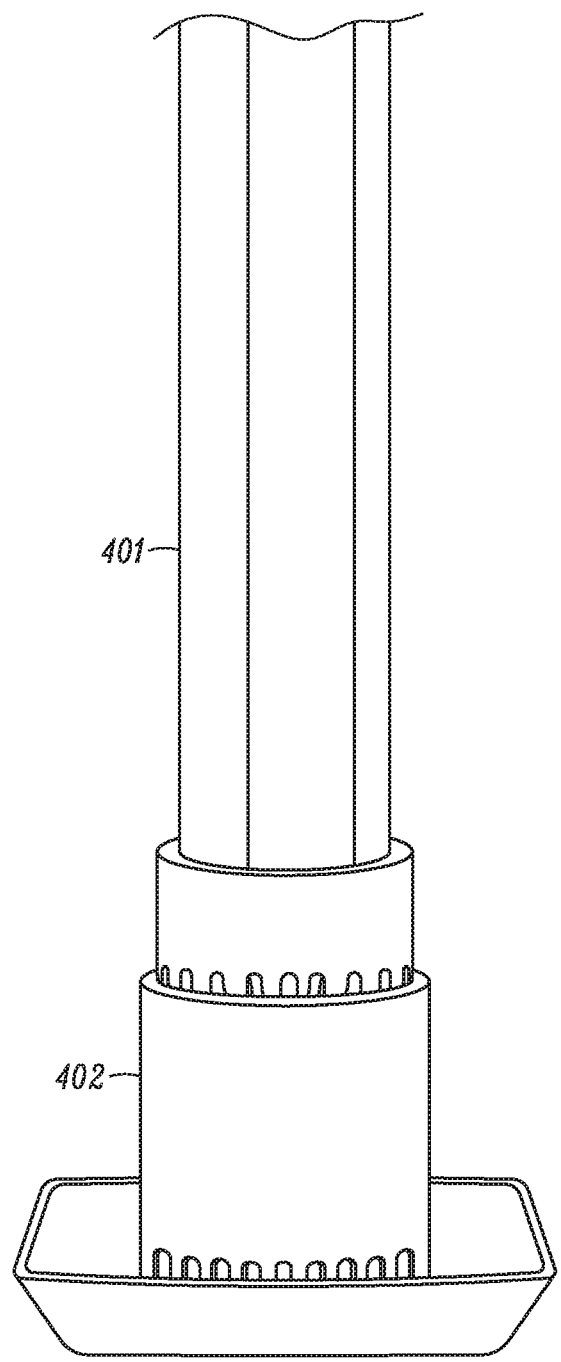
FIG. 8 is a side-view drawing illustrating an exemplary removable fluid removal pump inserted into an exemplary removable fluid removal pump filter.

FIG. 8 is a side-view drawing illustrating an exemplary removable fluid removal pump 401 being inserted into an exemplary removable fluid removal pump filter 402.

Figure 9:
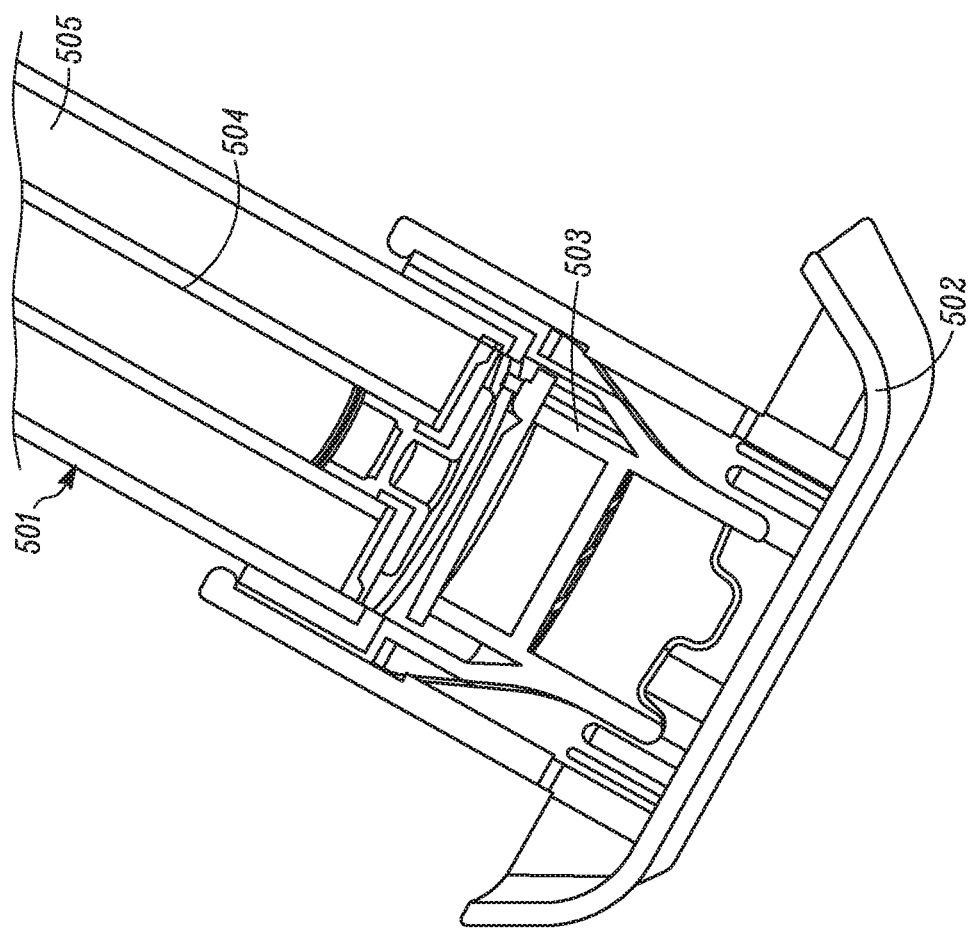
FIG. 9 is a cut away exploded side-view drawing illustrating an exemplary removable fluid removal pump inserted into an exemplary removable fluid removal pump filter.

FIG. 9 is a cut away and exploded side-view drawing illustrating an end of an exemplary removable fluid removal pump 501 inserted into an exemplary removable fluid removal pump filter 502. The fluid removal pump 501 includes a removable intake foot 503, a pump shaft 504, and a clear cylinder body 505.

Figure 10:
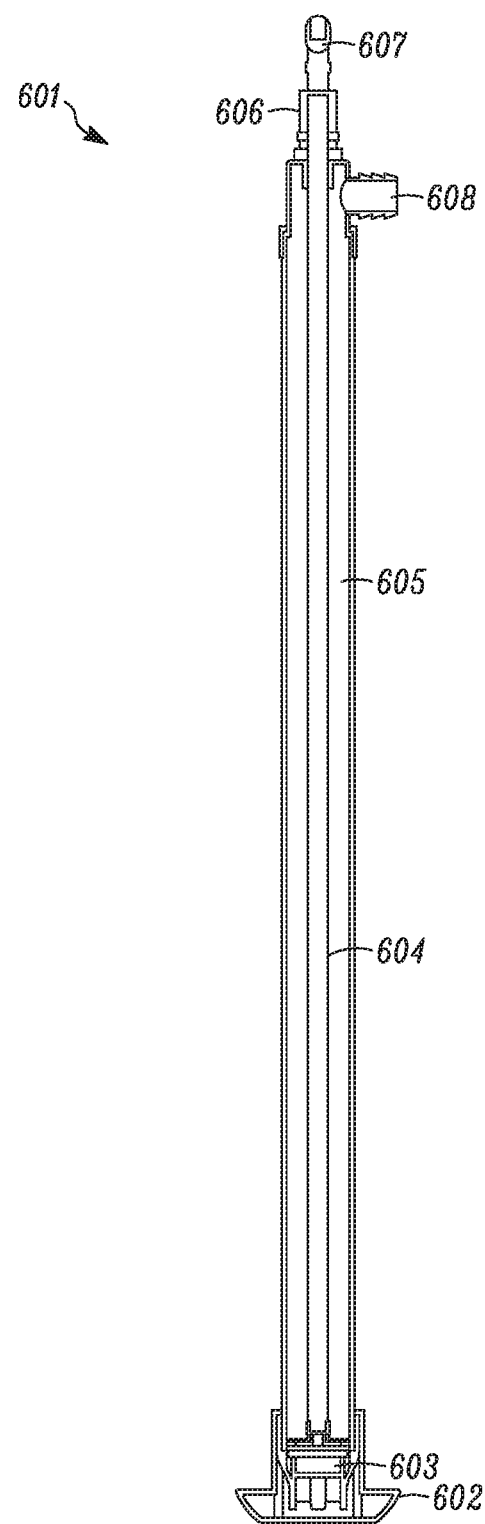
FIG. 10 is a cut away side-view drawing illustrating an exemplary removable fluid removal pump inserted into an exemplary removable fluid removal pump filter.

FIG. 10 is a cut away side-view drawing illustrating an exemplary removable fluid removal pump 601 inserted into an exemplary removable fluid removal pump filter 602. The fluid removal pump 601 includes a removable intake foot 603, a pump shaft 604, a clear cylinder body 605, a removable head assembly 606, a pump handle 607, and a discharge hose connector 608.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. A removable fluid removal pump filter for mounting on a fluid intake housing of a fluid removal pump having a fluid intake housing coupled to a pump shaft coupled to a head assembly having a pump handle and a discharge port; the removable fluid removal pump filter comprising:
   a first member having a first surface, a second surface, a proximal end, and a distal end,
      wherein the first member comprises an opening at the proximal end,
      wherein the second surface of the first member comprises a first internal diameter at the proximal end, a second internal diameter adjacent to the first internal diameter, and a third internal diameter adjacent to the second internal diameter and extending to the distal end,
      wherein the first internal diameter is greater than the second internal diameter,
      wherein the second internal diameter is greater than the third internal diameter,
      wherein the first member comprises one or more sets of apertures on the first surface at the distal end;
   a second member having a first surface and a second surface,
      wherein the first surface of the second member is directly coupled to the distal end of the first member to form a solid tray with one or more edges that each independently extends upward towards the proximal end of the first member and the one or more edges extend around the distal end of the first member, and
      wherein the first surface of the second member is planar with the distal end of the first member.

2. The removable fluid removal pump filter of claim 1, wherein the first member is cylindrical.

3. The removable fluid removal pump filter of claim 1, wherein the one or more sets of apertures at the distal end comprise two sets of apertures spaced around the distal end of the first member.

4. The removable fluid removal pump filter of claim 3, wherein the one or more sets of apertures at the distal end comprise two sets of apertures oppositely spaced around the distal end of the first member.

5. The removable fluid removal pump filter of claim 1, wherein the tray is a rectangular-shaped tray.

6. The removable fluid removal pump filter of claim 1, wherein the tray is a circular-shaped tray.

7. The removable fluid removal pump filter of claim 1, wherein the tray is a polygonal-shaped tray.

8. The removable fluid removal pump filter of claim 1, wherein the fluid is water.

9. A removable fluid removal pump filter for mounting on a fluid intake housing of a fluid removal pump having a fluid intake housing coupled to a pump shaft coupled to a head assembly having a pump handle and a discharge port; the removable fluid removal pump filter comprising:
   a cylindrical first member having a first surface, a second surface, a proximal end, and a distal end,
      wherein the cylindrical first member comprises an opening at the proximal end,
      wherein the second surface of the cylindrical first member comprises a first internal diameter at the proximal end, a second internal diameter adjacent to the first internal diameter, and a third internal diameter adjacent to the second internal diameter and extending to the distal end, wherein the first internal diameter is greater than the second internal diameter, wherein the second internal diameter is greater than the third internal diameter;

wherein the cylindrical first member comprises one or more sets of apertures on the first surface at the distal end;

a second member having a first surface and a second surface, wherein the first surface of the second member is directly coupled to the distal end of the cylindrical first member to form a solid tray with one or more edges that each independently extends upward towards the proximal end of the cylindrical first member and the one or more edges extend around the distal end of the cylindrical first member, and wherein the first surface of the second member is planar with the distal end of the cylindrical first member.

10. The removable fluid removal pump filter of claim 9, wherein the one or more sets of apertures at the distal end comprise two sets of apertures spaced around the distal end of the cylindrical first member.

11. The removable fluid removal pump filter of claim 10, wherein the one or more sets of apertures at the distal end comprise two sets of apertures oppositely spaced around the distal end of the cylindrical first member.

12. The removable fluid removal pump filter of claim 9, wherein the tray is a rectangular-shaped tray.

13. The removable fluid removal pump filter of claim 9, wherein the fluid is water.

14. A removable fluid removal pump filter for mounting on a fluid intake housing of a fluid removal pump having a fluid intake housing coupled to a pump shaft coupled to a head assembly having a pump handle and a discharge port; the removable fluid removal pump filter comprising:

a cylindrical first member having a first surface, a second surface, a proximal end, and a distal end, wherein the cylindrical first member comprises an opening at the proximal end, wherein the second surface of the cylindrical first member comprises a first internal diameter at the proximal end, a second internal diameter adjacent to the first internal diameter, and a third internal diameter adjacent to the second internal diameter and extending to the distal end, wherein the first internal diameter is greater than the second internal diameter, wherein the second internal diameter is greater than the third internal diameter, wherein the cylindrical first member comprises two sets of apertures on the first surface and oppositely spaced around the distal end of the cylindrical first member;

a second member having a first surface and a second surface, wherein the first surface of the second member is directly coupled to the distal end of the cylindrical first member to form a solid rectangular-shaped tray with one or more edges that each independently extends upward towards the proximal end of the cylindrical first member and the one or more edges extend around the distal end of the cylindrical first member, wherein the first surface of the second member is coupled to the distal end of the cylindrical first member to form a solid rectangular shaped tray, and wherein the first surface of the second member is planar with the distal end of the cylindrical first member.

15. The removable fluid removal pump filter of claim 14, wherein the fluid is water.

* * * * *